Aug. 31, 1965 G. R. HALL 3,203,653
INSULATORS FOR FIXTURES
Filed Feb. 18, 1963

INVENTOR.
GLENN R. HALL
BY *Elliott & Pastoriza*
ATTORNEYS.

United States Patent Office 3,203,653
Patented Aug. 31, 1965

3,203,653
INSULATORS FOR FIXTURES
Glenn R. Hall, 216 W. Figueroa, Santa Barbara, Calif.
Filed Feb. 18, 1963, Ser. No. 259,250
2 Claims. (Cl. 248—54)

This invention relates generally to insulators for fixtures and more particularly to novel sound insulators particularly designed for positioning between a supporting bracket and the supported member to deaden sound and other vibrations.

In the case of water pipes running under floor board supports in dwellings, by way of example, the pipes are periodically secured to the floor beams beneath the floor boards. The supporting of the pipes is achieved generally by U-shaped bracket members. In order to deaden the sound of water as well as other vibrations which may be established in the water pipes, most building codes require some type of insulating material to be wrapped about the pipe prior to cradling of the pipe by the bracket member.

As a matter of expediency, it has been the practice simply to take any conveniently available waste material and stuff it between the bracket and the pipe in question. However, since many fixtures and pipes are of different diameters, it is not always easy to find sufficient material to serve as the insulator. If several materials are stuffed together to serve as a single insulator, they may work loose from between the bracket and the pipe in question.

With all of the foregoing in mind, it is a primary object of this invention to provide a novel insulator for fixtures to serve as a substitute for make-shift material to the end that installation of fixtures such as pipes and the like is greatly simplified.

Another object is to provide an improved sound insulator which is readily converted to different sizes and shapes to the end that different types of fixtures may be insulated.

More particularly, it is an object to provide a novel sound insulator for pipes and the like adapted to be secured between the pipe and a supporting bracket therefor which is readily adjustable to the diameter of the pipe.

A more general object of the invention is to provide an improved sound insulator which is extremely economical to manufacture and which does not require any special tools to use.

Briefly, these and other object and advantages of this invention are attained by providing an insulator in the form of a foam plastic member adapted to be curved into a generally cylindrical shape. In accordance with a feature of the invention, the exterior cylindrical surface of the member is provided with lateral grooves running generally parallel to the axis of the member. These grooves enable the member to be straightened out into a flat configuration for use with certain types of fixtures or to be easily flexed into the curved cylindrical shape to surround a conduit or pipe prior to the positioning of a bracket about the pipe. In addition, the grooves provide a "score line" to enable easy separation of cylindrical sections of the member thereby enabling the diameter of the insulator to be progressively reduced as successive sections are removed at the grooves. The removed sections themselves may in turn be employed in other environments as insulating pads for different types of fixtures.

A better understanding of the invention will be had by now referring to a preferred embodiment thereof as illustrated in the accompanying drawings, in which.

Figure 1:
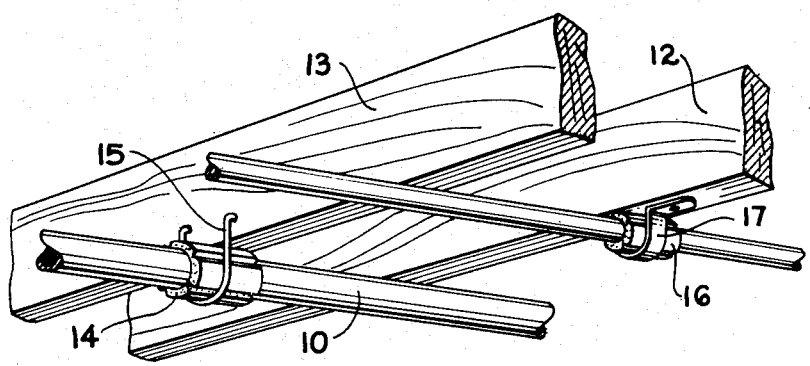
FIGURE 1 is a fragmentary perspective view illustrating two of the insulators of this invention employed in pipe brackets.

Referring first to FIGURE 1, there are shown by way of illustration first and second copper water pipes 10 and 11 running beneath floor board supports 12 and 13. As shown, there is provided an insulator 14 positioned between a portion of the pipe 10 and a U-shaped bracket 15 for supporting the pipe. The bracket 15 in turn is secured to the structural member 13.

Similarly, the pipe 11 is provided with an insulator 16 positioned between a portion of the pipe and a widened U-shaped bracket member 17 secured to the structural member 12. The insulators 14 and 16 are formed preferably of a plastic foam material and are arranged to be wrapped about the pipe portions as shown so as to provide complete insulation between the brackets and the pipe.

Figure 2:
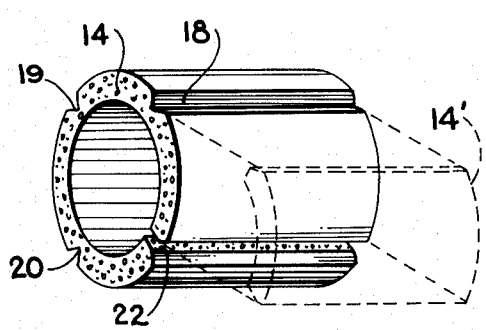
FIGURE 2 is an enlarged perspective view of one of the insulators illustrated in FIGURE 1.

Referring now to FIGURE 2, the insulator 14 is shown in detail as comprising a plastic foam member formed into a generally cylindrical shape including a plurality of V-shaped grooves 18, 19, and 20 running generally parallel to the axis of the cylindrical shape. The opposite edges of the member are brought together in juxtaposed relationship as at 21 and 22 to define a lateral slot in the cylindrical shape. The spacing between these opposed edges 21 and 22 is variable to provide small adjustments with respect to the diameter of the pipe about which the insulator 14 is to be wrapped.

In accordance with a first feature of the invention, the V-shaped grooves 18, 19, and 20 will permit easy flexing of the insulator from the cylindrical shape as shown into a relatively flat rectangular shape to adapt it for various different purposes. Further, the V-shaped grooves serve to define cylindrical shaped sections so that a section may be removed along one of the V-shaped grooves such as the V groove 18, the removed section being indicated at phantom lines by the numeral 14'. This removed section may be employed for a different type of fixture such as illustrated in FIGURE 3.

Figure 3:
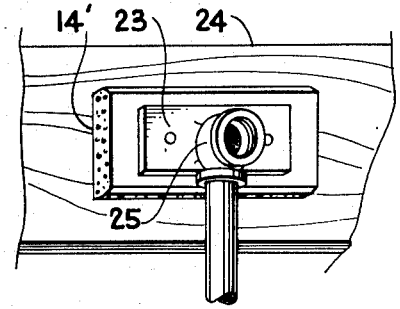
FIGURE 3 illustrates a fixture with a section of the insulator of FIGURE 2 used to deaden sound.

As shown in FIGURE 3, the removed cylindrically shaped section 14' is positioned between a bracket 23 and a structural member 24 for supporting a pipe fixture 25.

Figure 4:
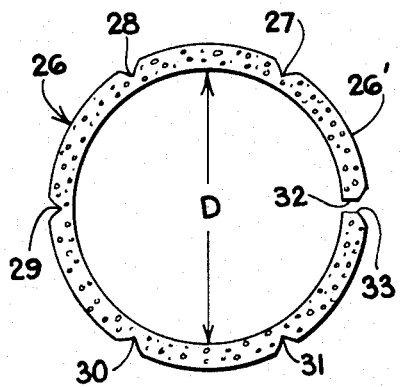
FIGURE 4 is an enlarged end elevational view of an insulator in accordance with the invention.
Figure 5:
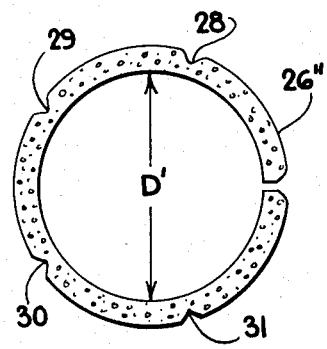
FIGURE 5 is a view similar to FIGURE 4 illustrating the manner in which the insulator may be reduced in diameter; and, FIGURE 6 is a view similar to FIGURE 5 illustrating a further reduction in diameter of the insulator.
Figure 6:
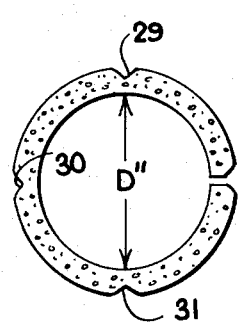

FIGURES 4, 5, and 6 illustrate in greater detail the manner in which the diameter of the insulator may be progressively reduced. Thus, with reference to FIGURE 4, there is illustrated an insulator 26 provided with V-shaped lateral grooves 27, 28, 29, 30, and 31. The opposing edges of the cylindrical shape are illustrated at 32 and 33. The insulator as shown in FIGURE 4 might be adapted for pipes having external diameters between one and one-half and two inches, for example. In the event it is desired to provide an insulator for a pipe having a diameter varying between one inch and one and one-quarter inch, one of the sections such as the section 26' may be removed along the V groove 27 and the entire structure circumferentially collapsed to provide a configuration illustrated in FIGURE 5. In this case, the diameter D of FIGURE 4 has now been reduced to a value D' for the smaller pipes in question.

Similarly, a second section such as the section 26" may be removed along the V groove 28 and the remaining structure circumferentially collapsed to provide an even smaller diameter insulator as indicated at D" in FIGURE 6.

In actual operation and use, a long roll of the insulation material may be provided with periodic V-shaped grooves extending thereacross. A given length may then be broken off from the roll and formed into the cylindrical shape for a particular pipe in question. Removed sections in turn may be employed for fixtures of the type illustrated in FIGURE 3.

From the foregoing description, it will thus be evident that the present invention has provided a greatly improved sound insulator for pipes and other types of fixtures. The plastic foam material itself is extremely economical to manufacture and the insulators will not work loose since they are adapted to be dimensioned for the particular fixture involved. Further, the cylindrically shaped sections may be manually removed so that special tools are not required to adapt the insulator to any particular type of fixture.

Various changes falling within the scope and spirit of the present invention will occur to those skilled in the art. The insulator is therefore not to be thought of as limited to the exact embodiments set forth merely for illustrative purposes.

What is claimed is:

1. A pipe insulator for positioning between a portion of pipe and a surrounding support bracket for securing said pipe to a structure and insulating said pipe against sound vibrations, comprising, in combination: a flexible member curved into a generally cylindrical shape with opposite edges in opposed relationship defining a lateral slot, said member having a smooth interior cylindrical surface and a plurality of longitudinal grooves formed in its exterior cylindrical surface running generally parallel to the axis of said cylindrical shape whereby cylindrically curved sections defined between said grooves are adapted to be successively removed by severing along successive grooves, respectively, to progressively reduce the diameter of said cylindrical shape so that said member is rendered adaptable to pipes of varying diameters without having said opposite edges overlap.

2. A pipe insulator for positioning between a portion of a pipe and a surrounding support bracket for securing said pipe to a structure and insulating said pipe against sound vibrations, comprising, in combination: a flexible member curved into a generally cylindrical shape with opposite edges in opposed relationship, said member including a plurality of elongated reduced thickness portions running generally parallel to the axis of said cylindrical shape whereby cylindrically curved sections defined between said reduced thickness portions are adapted to be successively removed by severing along said reduced thickness portions, respectively, to progressively reduce the diameter of said cylindrical shape so that said member is adaptable to surround pipes of different diameters without having said opposite edges overlap.

References Cited by the Examiner

UNITED STATES PATENTS

| 742,453 | 10/03 | Lake | 138—177 X |
|---|---|---|---|
| 1,435,311 | 11/22 | Knight | 138—128 |
| 1,985,582 | 12/34 | Schwinger | 240—85 |
| 2,003,159 | 5/35 | Taylor | 248—62 |
| 2,086,152 | 7/37 | Bodell | 247—39 |
| 2,126,114 | 8/38 | Jett | 220—326 |
| 2,291,148 | 7/42 | Carson | 248—54 |
| 2,354,485 | 7/44 | Slaughter | 138—128 |
| 2,681,732 | 6/54 | Brady | 229—51 |

FOREIGN PATENTS

| 338,481 | 7/59 | Switzerland. |
|---|---|---|

CLAUDE A. LE ROY, *Primary Examiner.*

FRANK L. ABBOTT, *Examiner.*